United States Patent
Kraft

(10) Patent No.: US 10,526,966 B2
(45) Date of Patent: Jan. 7, 2020

(54) GAS TURBINE EFFICIENCY AND POWER AUGMENTATION IMPROVEMENTS UTILIZING HEATED COMPRESSED AIR AND STEAM INJECTION

(71) Applicant: PowerPHASE LLC, Jupiter, FL (US)

(72) Inventor: Robert J. Kraft, Tequesta, FL (US)

(73) Assignee: POWERPHASE LLC, Jupiter, FL (US)

( * ) Notice: Subject to any disclaimer, the term of this patent is extended or adjusted under 35 U.S.C. 154(b) by 933 days.

(21) Appl. No.: 14/799,913

(22) Filed: Jul. 15, 2015

(65) Prior Publication Data

US 2016/0131030 A1    May 12, 2016

Related U.S. Application Data

(63) Continuation-in-part of application No. 14/534,347, filed on Nov. 6, 2014.

(51) Int. Cl.

| | |
|---|---|
| *F02C 3/30* | (2006.01) |
| *F02C 7/26* | (2006.01) |
| *F02C 7/32* | (2006.01) |
| *F01K 21/04* | (2006.01) |
| *F01K 23/10* | (2006.01) |

(Continued)

(52) U.S. Cl.
CPC ............ *F02C 3/305* (2013.01); *F01K 21/047* (2013.01); *F01K 23/10* (2013.01); *F02C 3/30* (2013.01); *F02C 6/18* (2013.01); *F02C 7/1435* (2013.01); *F02C 7/26* (2013.01); *F02C 7/32* (2013.01); *F05D 2260/2322* (2013.01); *Y02E 20/16* (2013.01)

(58) Field of Classification Search
CPC .... F02C 3/30; F02C 3/305; F02C 6/08; F02C 6/18; F05D 2260/2322; F01K 23/10; F01K 17/025; F01K 21/047; Y02E 20/16
See application file for complete search history.

(56) References Cited

U.S. PATENT DOCUMENTS

| | | |
|---|---|---|
| 3,359,723 A | 12/1967 | Bohensky et al. |
| 3,831,373 A | 8/1974 | Flynt |

(Continued)

FOREIGN PATENT DOCUMENTS

| | | |
|---|---|---|
| WO | 2013116185 | 8/2013 |
| WO | 2013151909 | 10/2013 |

(Continued)

OTHER PUBLICATIONS

Non-Final Office Action for U.S. Appl. No. 14/534,347, 17 pages.

(Continued)

*Primary Examiner* — Gerald L Sung
*Assistant Examiner* — Marc J Amar
(74) *Attorney, Agent, or Firm* — Lathrop Gage LLP

(57) ABSTRACT

The present invention discloses a novel apparatus and methods for augmenting the power of a gas turbine engine, improving gas turbine engine operation, and reducing the response time necessary to meet changing demands of a power plant. Improvements in power augmentation and engine operation include systems and methods for preheating piping of a power augmentation system and directing flows of hot compressed air, steam or a combination thereof into the gas turbine engine.

8 Claims, 9 Drawing Sheets

(51) Int. Cl.
*F02C 6/18* (2006.01)
*F02C 7/143* (2006.01)

(56) References Cited

U.S. PATENT DOCUMENTS

| | | | |
|---|---|---|---|
| 4,110,973 A * | 9/1978 | Haeflich | B01F 5/0475 |
| | | | 261/118 |
| 4,765,142 A | 8/1988 | Nakhamkin | |
| 4,841,721 A | 6/1989 | Patton et al. | |
| 4,870,816 A | 10/1989 | Nakhamkin | |
| 4,872,307 A | 10/1989 | Nakhamkin | |
| 4,885,912 A | 12/1989 | Nakhamkin | |
| 4,893,467 A * | 1/1990 | Woodson | F01K 21/047 |
| | | | 60/39.3 |
| 4,936,098 A | 6/1990 | Nakhamkin | |
| 4,969,324 A * | 11/1990 | Woodson | F01K 21/047 |
| | | | 60/775 |
| 5,329,758 A | 7/1994 | Urbach et al. | |
| 5,347,806 A | 9/1994 | Nakhamkin | |
| 5,369,951 A | 12/1994 | Corbett et al. | |
| 5,386,688 A | 2/1995 | Nakhamkin | |
| 5,540,045 A * | 7/1996 | Corbett | F01K 21/047 |
| | | | 60/39.3 |
| 5,778,675 A | 7/1998 | Nakhamkin | |
| 5,845,479 A | 12/1998 | Nakhamkin et al. | |
| 5,845,481 A | 12/1998 | Briesch | |
| 5,934,063 A * | 8/1999 | Nakhamkin | F02C 6/06 |
| | | | 60/727 |
| 5,979,156 A * | 11/1999 | Uematsu | F01K 23/10 |
| | | | 60/39.182 |
| 6,038,849 A * | 3/2000 | Nakhamkin | F02C 6/06 |
| | | | 60/726 |
| 6,134,873 A | 10/2000 | Nakhamkin et al. | |
| 6,145,294 A | 11/2000 | Traver et al. | |
| 6,212,871 B1 | 4/2001 | Rakhmailov | |
| 6,244,037 B1 | 6/2001 | Nakhamkin et al. | |
| 6,276,123 B1 | 8/2001 | Chen et al. | |
| 6,305,158 B1 | 10/2001 | Nakhamkin et al. | |
| 6,405,521 B1 * | 6/2002 | Ranasinghe | F01K 21/047 |
| | | | 60/39.182 |
| 6,499,303 B1 * | 12/2002 | Polukort | F01K 23/10 |
| | | | 60/39.182 |
| 6,526,758 B2 * | 3/2003 | Ranasinghe | F01K 21/047 |
| | | | 60/39.55 |
| 6,644,011 B2 | 11/2003 | Cheng et al. | |
| 7,389,644 B1 | 6/2008 | Nakhamkin | |
| 7,406,828 B1 | 8/2008 | Nakhamkin | |
| 7,614,237 B2 | 11/2009 | Nakhamkin | |
| 7,640,643 B2 | 1/2010 | Nakhamkin | |
| 7,669,423 B2 | 3/2010 | Nakhamkin | |
| 8,011,189 B2 | 9/2011 | Nakhamkin | |
| 8,261,552 B2 | 9/2012 | Nakhamkin | |
| 8,616,005 B1 | 12/2013 | Cousino, Sr. | |
| 8,776,521 B2 | 7/2014 | Tong et al. | |
| 8,863,519 B2 | 10/2014 | Kraft | |
| 2001/0000091 A1 | 4/2001 | Nakhamkin et al. | |
| 2001/0047649 A1 * | 12/2001 | Ranasinghe | F01K 21/047 |
| | | | 60/775 |
| 2005/0087330 A1 | 4/2005 | Kang et al. | |
| 2008/0178601 A1 | 7/2008 | Nakhamkin et al. | |
| 2009/0077979 A1 | 3/2009 | Masaki | |
| 2009/0200805 A1 | 8/2009 | Kim et al. | |
| 2010/0236240 A1 | 9/2010 | Hu et al. | |
| 2011/0005228 A1 | 1/2011 | Yoshinari et al. | |
| 2011/0181050 A1 * | 7/2011 | Dinu | F02C 3/13 |
| | | | 290/1 R |
| 2012/0031581 A1 | 2/2012 | Chillar et al. | |
| 2012/0036860 A1 | 2/2012 | Wettstein et al. | |
| 2013/0186101 A1 | 7/2013 | Mundra et al. | |
| 2014/0033714 A1 | 2/2014 | Gonzalez Salazar et al. | |
| 2014/0250902 A1 | 9/2014 | Kraft | |
| 2014/0260311 A1 * | 9/2014 | Berlowitz | C01B 3/34 |
| | | | 60/780 |
| 2014/0352318 A1 | 12/2014 | Kraft | |
| 2014/0366547 A1 | 12/2014 | Kraft et al. | |
| 2014/0373551 A1 | 12/2014 | Kraft et al. | |
| 2015/0159873 A1 * | 6/2015 | Melton | F01D 25/26 |
| | | | 60/726 |
| 2015/0233296 A1 | 8/2015 | Kraft | |
| 2016/0131030 A1 | 5/2016 | Kraft et al. | |

FOREIGN PATENT DOCUMENTS

| | | | |
|---|---|---|---|
| WO | WO 2013151909 A1 * | 10/2013 | F02C 6/16 |
| WO | 2014055717 | 4/2014 | |
| WO | 2014066276 | 5/2014 | |

OTHER PUBLICATIONS

International Search Report and Written Opinion dated Dec. 20, 2016, for International Patent Application No. PCT/US2016/038468.
U.S. Appl. No. 14/350,469, filed Apr. 8, 2014, 141 pages.
U.S. Appl. No. 14/351,245, filed Apr. 11, 2014, 61 pages.
U.S. Appl. No. 14/329,340, filed Jul. 11, 2014, 76 pages.
U.S. Appl. No. 14/329,433, filed Jul. 11, 2014, 80 pages.
U.S. Appl. No. 14/462,000, filed Aug. 18, 2014, 54 pages.
U.S. Appl. No. 14/534,598, filed Nov. 6, 2014, 45 pages.
U.S. Appl. No. 62/055,247, filed Sep. 25, 2014, 27 pages.
Application No. PCT/US2013/034748, filed Mar. 31, 2013, Search Report and Written Opinion, dated Jun. 28, 2013, 15 pages.
Application No. PCT/US2013/063177, filed Oct. 3, 2013, Search Report and Written Opinion, dated Feb. 28, 2014, 15 pages.
Application No. PCT/US13/65998, filed Oct. 21, 2013, Search Report and Written Opinion, dated May 19, 2014, 18 pages.
U.S. Appl. No. 14/534,347, filed Nov. 6, 2014, 41 pages.
Application No. PCT/US15/22753, filed Mar. 26, 2015, Search Report and Written Opinion, dated Aug. 14, 2015, 11 pages.
NASA, Compressor Thermodynamics, Jun. 12, 2014, Current Version at: https://www.grc.nasa.gov/www/k-12/airplane/compth.html (Cited version obtained from Wayback Machine online), p. 2.

* cited by examiner

GAS TURBINE EFFICIENCY AND POWER AUGMENTATION IMPROVEMENTS UTILIZING HEATED COMPRESSED AIR AND STEAM INJECTION

CROSS-REFERENCE TO RELATED APPLICATIONS

This application is a continuation-in-part of copending U.S. patent application Ser. No. 14/534,347 filed Nov. 6, 2014, which is incorporated by reference herein in its entirety.

TECHNICAL FIELD

The invention relates generally to gas turbine engine power systems incorporating a power augmentation system. More specifically, improvements relating to steam and air power augmentation are provided.

BACKGROUND OF THE INVENTION

Currently, many gas turbine engines operating at power plants utilize steam injection systems as a low-cost form of power augmentation. Typically steam injection is considered a relatively constant process because the start-up time and shut-down time of the steam injection system is typically on the order of thirty to sixty minutes.

Some steam injection systems of the prior art have a steam bleed near the injection point so that the steam can be used to heat the steam injection pipes. As steam injection is initiated through cold pipes, the hot steam condenses and forms water which is vented through the steam vent. Steam flow is gradually increased until the pipes are sufficiently heated, at which point water no longer forms. The steam vent then closes and the system is ready to inject steam into the gas turbine engine. This heating process for the steam pipes typically takes approximately thirty minutes.

Other prior art steam injection systems heat the steam injection pipes by slowly adding steam to the steam injection pipe and any resulting water that forms is injected into the gas turbine. Since the flow rates are extremely low, as water is typically not desired to be injected through a steam injection system into the gas turbine, this process typically takes in excess of thirty minutes to complete.

Steam is typically generated at a gas turbine site to either drive a steam turbine for producing additional power or is delivered to a supplemental process, such as an adjacent manufacturing facility, or in some cases both. When steam is generated for a supplemental process, the gas turbine power plant is referred to as a cogeneration plant, or cogen plant, because it is producing two products, electricity and steam. The recipient of the steam is called the steam host. Examples of a steam host can include a manufacturing or processing plant. Most cogen plants supply both electricity and steam to the steam host and sometimes the steam requirement and power requirement are not optimally balanced, so the cogen plant has to continuously optimize and balance the steam production and gas turbine output to try to meet the steam host's demand. This is a significant challenge, and as a result, there are periods when excess steam is produced as a result of the power requirement that cannot be avoided and in these cases, the cogen process loses efficiency.

Steam injection power augmentation systems are not typically deployed to meet short term spot market demands because they can take too long to come online and be available. For example, if there is a spike in power demand that is not expected to last long, then the steam injection power augmentation system is not advantageous to use. Additionally, steam injection systems are not considered optimal for fast-acting regulation devices due to their slow start-up speed.

A gas turbine incorporating a steam injection system in accordance with the prior art is depicted in FIG. 1. The gas turbine comprises a compressor 10 which compresses ambient air 20 to an elevated pressure and temperature and then discharges hot pressurized air into a compressor discharge case 14, or CDC. The compressor discharge case 14 is sometimes referred to as a wrapper because it houses the combustion and transition section of the gas turbine. The hot pressurized air enters the combustion chamber 12 where fuel 24 is added. The mixture of fuel and air is ignited and forms combustion gases. The hot combustion gasses are directed to the turbine section 16 which produces about twice the power being consumed by the compressor and therefore, the net power is delivered to a generator 18 for the gas turbine. As the hot gasses 22 exit the turbine section 16, the hot gasses 22 are directed into a heat recovery steam generator (HRSG) 605, where pressurized water is turned into pressurized steam 603 which exits the HRSG 605 and is directed into a steam turbine, a steam process, or both (602). When power augmentation with steam injection is desired, the steam injection isolation valve 113 is opened, the steam injection valve 114 is partially opened and the steam vent valve 616 is opened to allow a small amount of steam to flow through the steam injection piping 601. Water is typically formed as the steam system is warmed up and the water is drained as required through the vent valve 616. When the steam pipes 601 are heated and condensation no longer forms, steam 615 flows out of the vent system, the steam vent valve 616 is closed and the steam injection valve 114 is opened to allow the desired amount of steam injection into the gas turbine.

Typically the distance between the steam injection valve 114 and the steam injection isolation valve 113 can be several hundred feet. As a result, it takes about thirty minutes for the steam injection system to preheat to a desired operating temperature. Some steam injection systems do not have the steam vent valve 616 and therefore they can take even longer to preheat because of the sensitivity to injecting water into the gas turbine as the steam injection system is started up.

SUMMARY

The current invention provides several embodiments for preheating a steam injection power augmentation system using compressed air to allow a rapid start of the steam injection system.

One aspect of the present invention relates to methods and systems that allow gas turbine systems to bleed air from the steam injection site within the gas turbine towards the source of the steam in order to preheat the steam injection piping to reduce the chance of water formation during steam injection start-up.

Another aspect of the present invention relates to methods and systems that allow gas turbine systems to bleed air from an external source of hot compressed air to the location of the steam injection near the gas turbine preheat the steam injection lines to eliminate the chance of water formation during steam injection initiation.

One embodiment of the invention relates to adding an air bleed valve on a new or existing steam injection system near the site of the steam source to allow air to backflow from the gas turbine to the site near the source of the steam.

Another embodiment of the invention relates to a system comprising a supplemental air injection system, such as a TurboPHASE system, providing hot compressed air to the gas turbine to preheat the steam injection piping.

Another advantage of the preferred embodiment is a more efficient use of steam such that excess steam being produced can now be used to reduce plant steam output while at the same time increasing plant electrical power output.

In another aspect of the present invention, a system and methods are provided for utilizing steam from a combined cycle power plant operation to provide additional mass flow to a gas turbine engine. Additional air is supplied to the gas turbine engine in order to provide power augmentation to the gas turbine engine. A power augmentation system is provided comprising a gas turbine engine, a heat recovery steam generator, steam injection piping connecting the gas turbine engine to the heat recovery steam generator, an air vent and air vent valve in communication with the steam injection piping, and an auxiliary air compression system comprising a fueled engine, an intercooled compressor, and a recuperator, where the recuperator heats air from the compressor with exhaust heat from the fueled engine. The steam injection valve, isolation valve, and air injection valve selectively permit a flow of steam from the heat recovery steam generator or air from the auxiliary air compression system, through the steam injection piping and into the gas turbine engine. A series of ways to operate the power augmentation system to improve gas turbine engine performance are also provided.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The present invention is disclosed in FIGS. 2-9. An aspect common to all embodiments of the present invention is an air vent valve 112 positioned near the source of the steam injection, typically very close to the steam injection valve 114. Before steam injection is initiated, the air vent valve 112 is opened to allow air to flow through the steam injection piping, towards the steam source, and discharged into the atmosphere 156. This allows the steam injection piping to be pre-heated to increase the speed that power augmentation with the steam injection system can be started. Various embodiments for heating the steam pipes are discussed herein.

Typically, steam injection takes at least thirty minutes to initiate and achieve a desired steam injection level. With the steam system pre-heated, the steam injection system can be brought to full flow in less than three minutes. This same air bleed system can be used to purge the steam injection lines when the steam injection process is finished. Typically when the steam injection process is turned off, it is ramped down slowly, many times at a much slower pace than the start-up process. The steam flow is ramped down, because if the steam process is suddenly stopped, the steam injection piping will be full of steam and this steam will turn into water when the steam cools down. Utilizing an air purge system as disclosed herein allows the steam injection to be stopped rapidly, as the steam can be purged from the air steam lines with a process similar to the pre-heat cycle.

An additional benefit of both the pre-heat and the post purge is that the reverse flow can purge out any foreign matter that might be obstructing the steam injection system. For example, on a General Electric Frame 7FA gas turbine engine, the steam injection system has known operating issues such as plugging of the steam injection system. In this system, the steam is supplied to the gas turbine through a six inch pipe, which is a manifold to fourteen distinct combustors through a three inch pipe. Inside each combustor can there is an annulus that is approximately one inch wide by 0.75 inches tall that supplies ten steam pegs that have five holes approximately 0.030" in diameter. If a foreign matter gets in the flow of steam, it will plug these small holes in the pegs. By purging air from these small holes, any foreign matter that might be caught in them can be flushed out to atmosphere or where ever the air vent is discharging the air.

Figure 1:
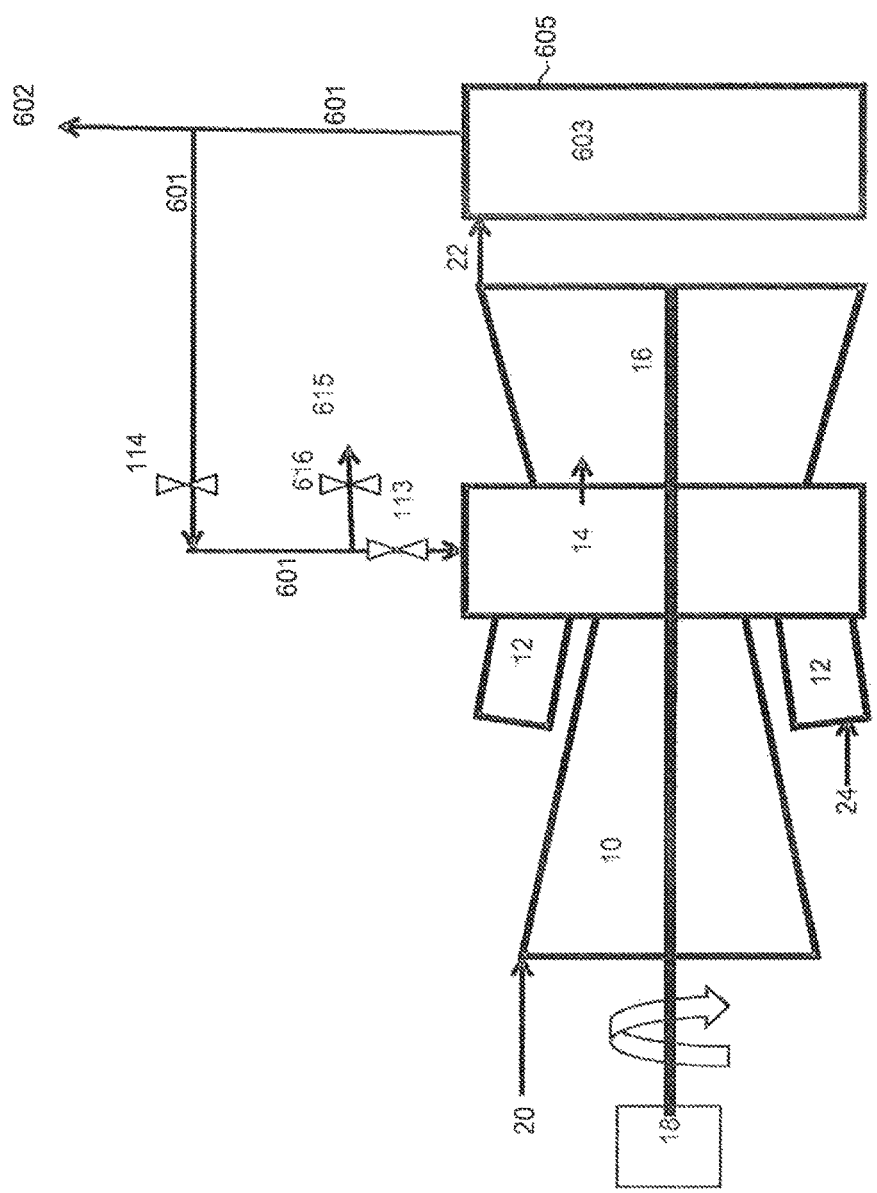
FIG. 1 is a schematic drawing of a steam injection system on a gas turbine engine of the prior art.
Figure 2:
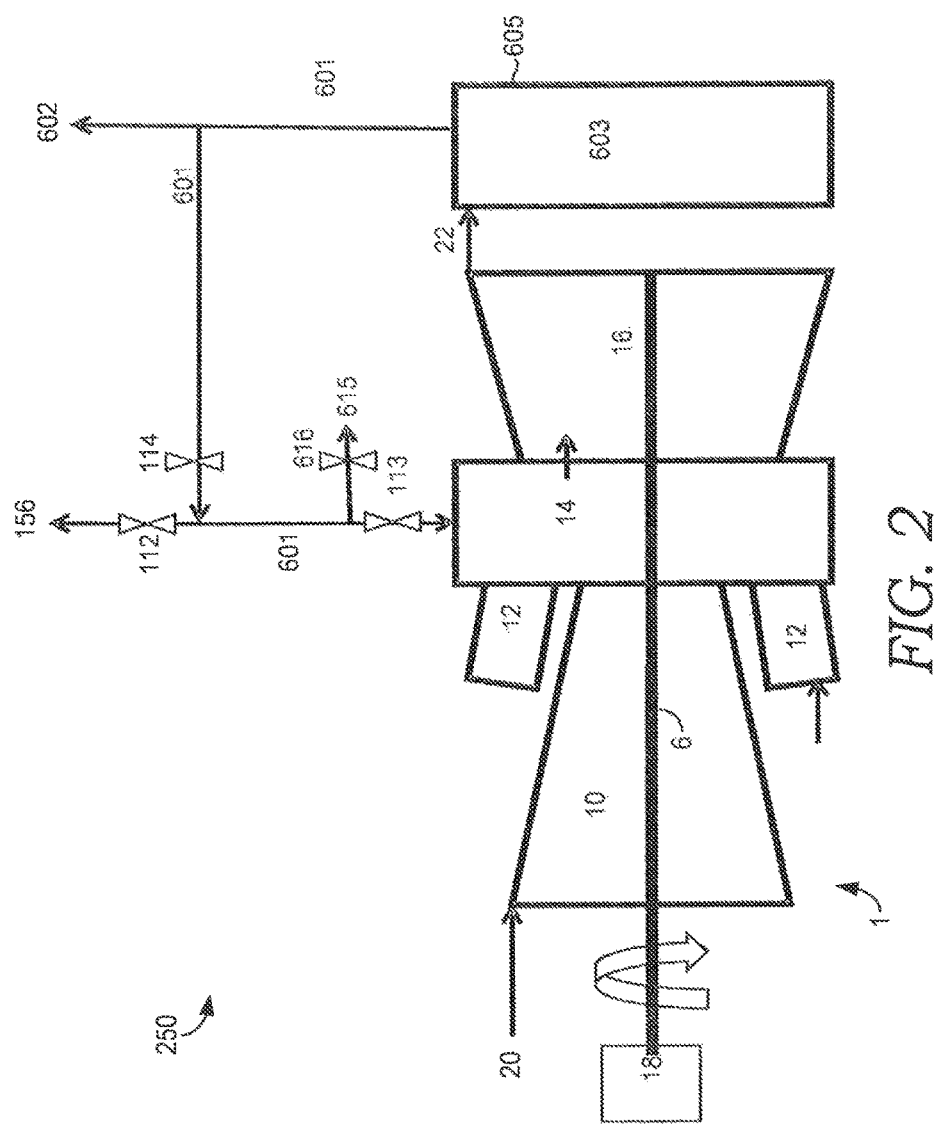
FIG. 2 is a schematic drawing of an embodiment of the present invention where an air bleed system is added to a new or existing steam injection system on a gas turbine engine.

Referring now to FIG. 2, a system for preheating a power augmentation system of a power plant is provided. The system 250 comprises a gas turbine engine 1 comprising a compressor 10 coupled to a turbine 16 by a shaft 6. The compressor 10 and turbine 16 are in fluid communication with one or more combustors 12. The system 250 also comprises a heat recovery steam generator 605, or HRSG. The HRSG 605 takes hot exhaust gases 22 from the turbine 16 and a water supply source (not shown) and generates a supply of steam 603.

The system 250 also comprises steam injection piping 601 connecting the gas turbine engine 1 to the HRSG 605. More specifically, the steam injection piping 601 comprises a steam injection valve 114 and an isolation valve 113. The system 250 also comprises an air vent 156 and air vent valve 112 that is in communication with the steam injection piping 601. As will be discussed further below, the isolation valve 113 and air vent valve 112 selectively permit the flow of compressed air from the compressor 10, and/or a compressor discharge plenum 14, through the steam injection piping 601 and to the air vent 156, thereby preheating the steam injection piping 601. The steam injection piping also includes a steam vent valve 116 for venting steam to the atmosphere through a steam vent 115 when steam is flowing.

It is important to note that the positions of the steam injection valve 114 and orientation of steam injection piping 601 is merely illustrative of an embodiment of the present invention. As such, it is envisioned that the steam injection valve 114 may be positioned closer to the HRSG 605. For example, in one embodiment is envisioned that the steam injection piping 601 between the steam injection valve 114 and gas turbine engine 1 could be a couple hundred feet in length.

Steam 603 produced by the HRSG 605 can be used for multiple purposes. A portion of the steam 603 can be directed through steam injection piping 601, as discussed herein, for injection in the gas turbine engine 1. Alternatively, a portion of the steam 603 can be directed to an external process 602, such as for use in an adjacent manufacturing plant.

Figure 3:
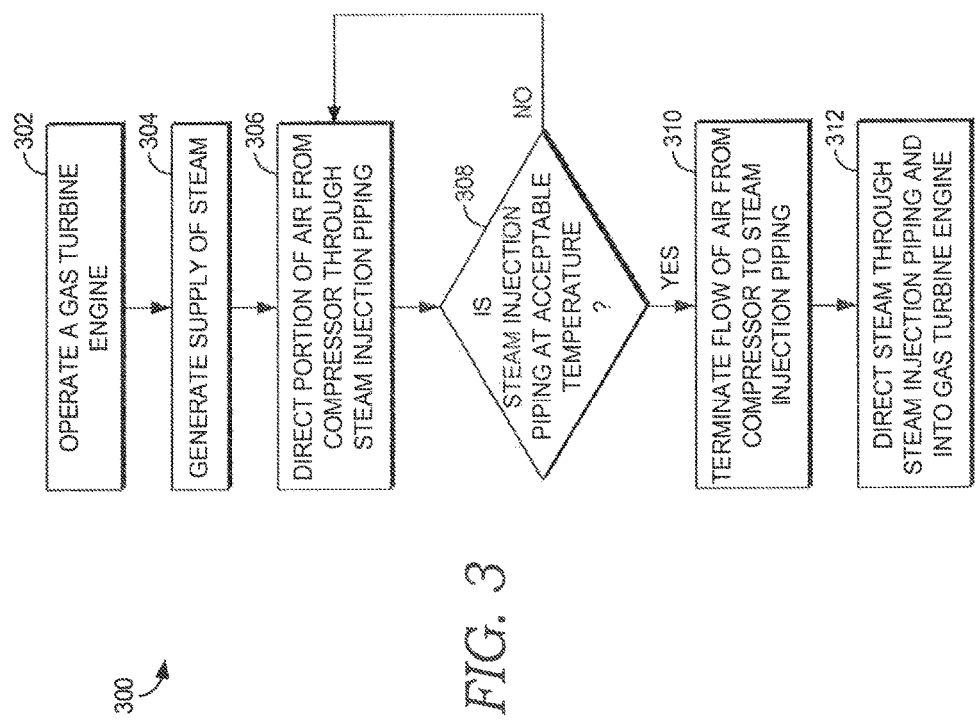
FIG. 3 is a flow diagram identifying a method of preheating a power augmentation system.

Referring now to FIG. 3, a method 300 of operating a gas turbine energy system is disclosed. In a step 302, a gas turbine engine is operated where the gas turbine engine has a compressor coupled to a turbine, and the compressor and turbine are in fluid communication with one or more combustors. A steam injection system is also in communication with the gas turbine engine where the gas turbine engine produces a heated exhaust utilized by the steam injection system for producing steam.

In a step 304, a supply of steam is generated by the heated exhaust from the gas turbine engine. Then, in a step 306, a portion of the air from the compressor, or compressor discharge plenum, is directed through at least a portion of the steam injection piping. As shown in FIG. 2, the steam injection piping utilizes an isolation valve adjacent the compressor and an air vent valve for permitting the flow of compressed air to pass from the compressor and through the steam injection piping. As a result of the flow of compressed air the temperature of the steam injection piping is increased and the piping is preheated.

In a step 308, a determination is made as to whether the steam injection piping temperature has reached an acceptable level. Generally speaking, for the Frame 7FA gas turbine engine discussed above, the steam injection piping is desired to reach approximately 500 degrees Fahrenheit. If the temperature of the steam injection piping has not reached the desired temperature, then compressed air continues to pass through the steam injection piping in order to raise the temperature of the steam injection piping. As discussed above, an isolation valve and air vent valve are opened to permit the flow of compressed air from the gas turbine engine to preheat the steam injection piping. Furthermore, once the determination is made in step 308 that the piping has reached an acceptable temperature, the air vent valve closes and steam injection valve opens, directing steam from the HRSG through the piping. Once the steam injection piping has reached its desired operating temperature, then in a step 310, the flow of air from the compressor to the piping is terminated and then in step 312, at least a portion of the steam supply is directed through the piping and into the gas turbine engine. It is understood that the use of steam and compressed air could overlap such that both fluids could be passing through the piping. Furthermore, it is possible that steam and air could be vented from the piping simultaneously.

Figure 4:
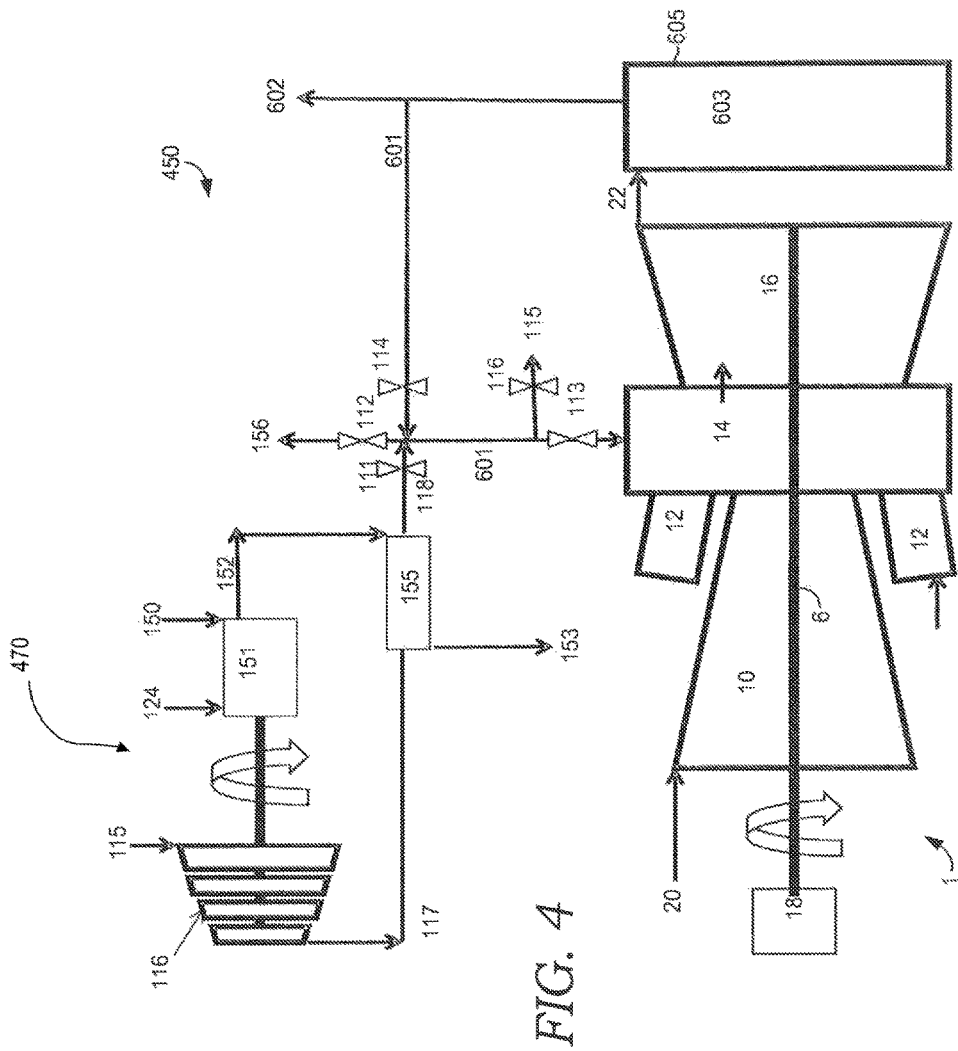
FIG. 4 is a schematic drawing of an embodiment of the present invention where a supplementary source of compressed air is used to preheat the steam injection lines.

Referring now to FIG. 4, an alternate system for preheating a power augmentation system is disclosed. The system disclosed in FIG. 4 provides an alternate source of compressed air for preheating the steam injection piping. More specifically, the system 450 comprises a gas turbine engine 1 comprising a compressor 10 coupled to a turbine 16 by a shaft 6. The compressor 10 and turbine 16 are in fluid communication with one or more combustors 12. The system 450 also comprises a heat recovery steam generator 605, or HRSG. The HRSG 605 takes hot exhaust gases 22 from the turbine 16 and a water supply source (not shown) and generates a supply of steam 603. As will be discussed below, the HRSG 605 is in selective fluid communication with the gas turbine engine 1.

The system 450 also comprises steam injection piping 601 connecting the gas turbine engine 1 to the HRSG 605. More specifically, the steam injection piping 601 comprises a steam injection valve 114, a steam vent valve 116, and an isolation valve 113. The system 250 also comprises an air vent 156 and air vent valve 112 that are in communication with the steam injection piping 601. As will be discussed further below, the isolation valve 113 and air vent valve 112 selectively permit the flow of compressed air to the steam injection piping 601, thereby preheating the steam injection piping. The steam injection piping 601 also includes a steam vent valve 116 for venting steam to the atmosphere through a steam vent 115.

It is important to note that, as with the system 250 in FIG. 2, the positions of the steam injection valve 114 and orientation of steam injection piping 601 is merely illustrative of an embodiment of the present invention. As such, it is envisioned that the steam injection valve 114 may be positioned closer to the HRSG 605. For example, in an embodiment of the present invention, steam injection piping 601 downstream of the steam injection valve 114 could be a couple hundred feet in length.

Steam 603 produced by the HRSG 605 can be used for multiple purposes. A portion of the steam 603 can be directed through steam injection piping 601, as discussed herein, for injection in the gas turbine engine 1. Alternatively, a portion of the steam 603 can be directed to an external process 602, such as for use in an adjacent manufacturing plant.

The power augmentation system 450 also comprises an auxiliary air compression system 470 which provides a source of external heated compressed air. One such system is produced by PowerPHASE, LLC of Jupiter, Fla., the same assignee as the present invention. The auxiliary air compression system 470 is similar to that disclosed in co-pending patent applications including U.S. patent application Ser. Nos. 14/350,469, 14/351,245, 14/329,340, 14/329,433, 14/462,000, and 14/534,598.

Such an auxiliary source of compressed air comprises a fueled engine 151 coupled to a multi-stage compressor 116. The fueled engine 151 takes ambient air 150 and fuel 124 and through its operation provides mechanical output in the form of power to drive the shaft which is coupled to compressor 116 as well as exhaust heat 152. The compressor 116 is a multi-stage intercooled compressor in which ambient air 115 is drawn into the compressor 116 and compressed to a higher pressure. After each stage of compression, the compressed air is cooled, thereby permitting further compression. After the air passes through the last stage of the intercooled compressor 116, the compressed air 117 passes into a recuperator 155. The recuperator 155 receives the compressed air 117 and exhaust heat 152 from the fueled engine 151. The temperature of the compressed air 117 increases as it passes through the recuperator 155 which is heated with the exhaust heat 152 to produce hot compressed air 118. The system 450 also comprises an air injection valve 111 located between the recuperator 155 and the steam injection piping 601. That is, upon opening of the air injection valve 111 and valve 116, heated compressed air from the auxiliary source of compressed air is directed into the steam injection piping 601. The auxiliary source of compressed air can be used to preheat the steam piping 601, inject air into the gas turbine 1, and also inject steam and air into the gas turbine.

Typically, the steam injection piping 601, which in this case is also an air injection means, is designed such that the pressure of the hot compressed air 118, or steam if it is being injected instead of air, is only about 5 to 10 psi higher than pressure in the gas turbine combustion discharge wrapper 14.

Figure 5:
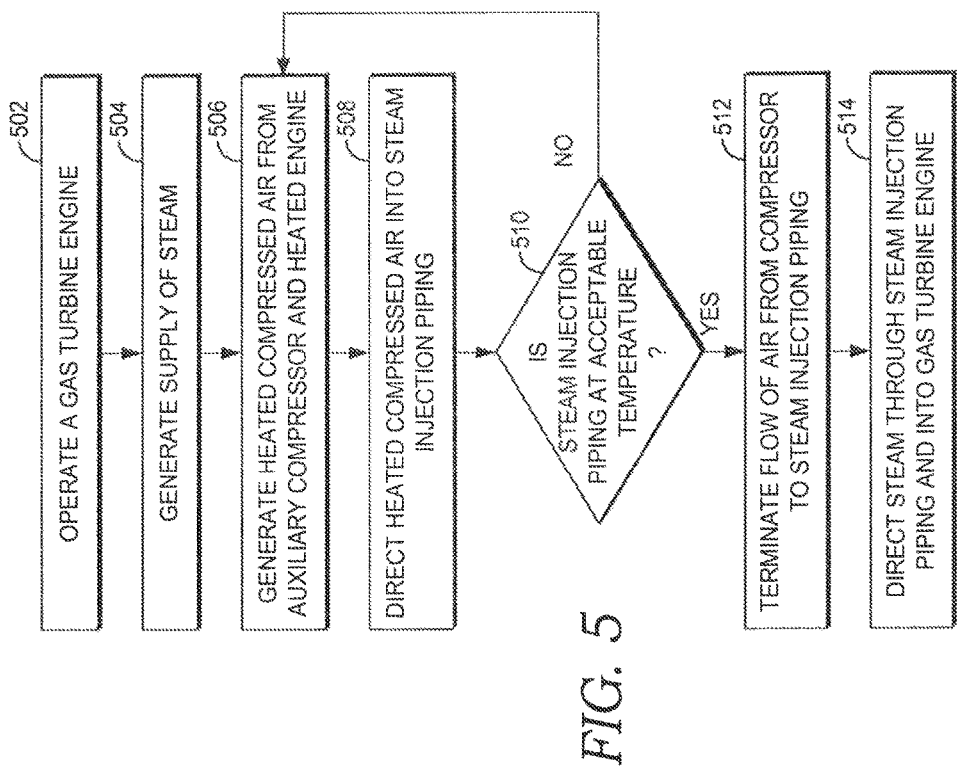
FIG. 5 is a flow diagram identifying an alternate method for preheating a power augmentation system.

Referring now to FIG. 5, an alternate method 500 of operating a gas turbine energy system is provided. The method disclosed in FIG. 5 corresponds to the system disclosed in FIG. 4. More specifically, in a step 502, a gas turbine engine is operated where the gas turbine engine has a compressor coupled to a turbine, where the compressor and turbine are in fluid communication with one or more combustors. A steam injection system is also in communication with the gas turbine engine where the gas turbine engine produces a heated exhaust utilized by the steam injection system for producing steam.

In a step 504, a supply of steam is generated by heated exhaust from the gas turbine engine. Then, in a step 506, heated compressed air from an auxiliary compressor and heated engine is generated. As shown in FIG. 4, the steam injection piping utilizes an isolation valve adjacent the compressor, an air injection valve, and an air vent valve for permitting the flow of compressed air to pass from the auxiliary source of compressed air and through the steam injection piping. As a result of the flow of compressed air the temperature of the steam injection piping is increased and the piping is preheated.

In a step 508, the heated compressed air from the auxiliary source of compressed air produced by the fueled engine and intercooled compressor is directed into the steam injection piping. Then, in a step 510, a determination is made as to whether the steam injection piping temperature has reached an acceptable level. Generally speaking, for the Frame 7FA gas turbine engine discussed above, the steam injection piping is desired to reach approximately 500 degrees Fahrenheit. If the temperature of the steam injection piping has not reached the desired temperature, then compressed air continues to pass through the steam injection piping in order to raise the temperature of the steam injection piping, as discussed with respect to step 508. Once the steam injection piping has reached its desired operating temperature, then in a step 512, the flow of air from the compressor to the piping is terminated. Once the steam injection piping is at its desired temperature, then in step 514, at least a portion of the steam supply is directed through the piping and into the gas turbine engine. As discussed above, an air injection valve and air vent valve are opened to permit the flow of compressed air from the auxiliary source of compressed air to preheat the steam injection piping. Furthermore, once the determination is made in step 510 that the piping has reached an acceptable temperature, the air vent valve closes and steam injection valve opens, directing steam from the HRSG through the piping. It is understood that the use of steam and compressed air could overlap such that both fluids could be passing through the piping. Furthermore, it is possible that steam and air could be vented from the piping simultaneously.

Typical steam injection systems utilize steam that is in a highly superheated phase because of the potential temperature drop and concern for water formation. Also, high pressure steam injection systems promote even distribution of the steam throughout the gas turbine and steam nozzles are employed at the point of injection to accomplish this. Therefore the steam that is used is in a very high energy state, typically accomplished by using higher pressure steam, typically 100 to 150 psi higher than the pressure in the gas turbine compress discharge wrapper 114. With a combined air and steam injection system, the air 118 and steam 603 would be joined together and mix as they travel through the steam piping 601 and therefore, much lower quality steam can be used to accomplish the same level of power augmentation. Typically steam quality would be lowered by utilizing lower pressure steam source, and therefore, the steam would have been able to perform useful work in the steam turbine cycle before being extracted for injection, which improves the efficiency of the steam injection system.

Referring now to FIGS. 4 and 6-9, a series of alternate embodiments of the present invention are disclosed. In one embodiment, a power augmentation system 450 for a gas turbine engine is provided including utilizing a steam flow to provide a source of additional mass flow to the gas turbine engine, such that power output from the gas turbine engine 1 can be maintained while consuming less fuel. Furthermore, the power augmentation system 450 can also provide additional power output by increasing the air flow through the gas turbine engine 1 via hot compressed air from an auxiliary air compression system 470.

The system 450 comprises a gas turbine engine 1 comprising a compressor 10 coupled to a turbine 16 by a shaft 6. The compressor 10 and turbine 16 are in fluid communication with one or more combustors 12 through a compressor discharge case 14. In fluid communication with the gas turbine engine 1 is a heat recovery steam generator (HRSG) 605 capable of producing steam for use in a power plant or external to the power plant.

Steam injection piping 601 is connected to the gas turbine engine 1 and the HRSG 605, where the steam injection piping 601 has a steam injection valve 114 and an isolation valve 113. The exact locations of the steam injection valve 114 and isolation valve 113 can vary. However, in one embodiment, the steam injection valve 114 is positioned near the where steam from the HRSG 605 is split to go to an external process 602, such as a steam turbine (not shown).

The auxiliary air compression system 470 comprises a fueled engine 151 coupled to a multi-stage intercooled compressor 116. Compressed air from the intercooled compressor 116 passes to a recuperator 155 where it is heated with exhaust heat from the fueled engine 151. The resulting output from the recuperator 155 is hot compressed air 118.

The power augmentation system 450 also comprises an air vent and an air vent valve 112 for regulating the flow of air through an air vent and to the atmosphere 156. Together, the air injection valve 111, air vent valve 112, and steam injection valve 114 are operable to selectively permit a flow of steam from the HRSG 605, or hot compressed air 118 from the auxiliary air compression system 470 through the steam injection piping 601 and to the gas turbine engine 1.

As discussed above, the power augmentation system 450 comprises valving for selectively directing air from the compressor discharge case 14 to flow into the steam injection piping 601 to preheat the steam injection piping 601. Heating the steam injection piping 601 prior to passing steam therethrough reduces the tendency for the steam flow to form condensation in the steam injection piping 601. In order for the air from the compressor discharge case 14 to flow through the steam injection piping 601, the isolation valve 113 is opened as well as the air vent valve 112, while the air injection valve 111 and steam injection valve 114 remain closed. In this configuration, compressed air from the gas turbine engine 1 is bled through the isolation valve 113, heats the steam injection piping 601 and vents to the atmosphere 156. Thus, when the compressor discharge air flow is used to heat the steam injection piping 601, it flow in a direction opposite of the flow of steam from the HRSG 605 or the air from the auxiliary air compression system 470.

As will be discussed in further detail below, the power augmentation system 450 provides a series of options to a gas turbine engine operator for injecting a steam flow, auxiliary source of compressed air, or a combination of the two into the gas turbine engine 1. The exact injection point for the flow of steam or compressed air from the auxiliary air compression system 470 can vary. However, as one skilled in the art will understand, one such injection point is the compressor discharge case 14, the area immediately upstream of the combustors 12 such that any work from the additional fluid provided to the gas turbine engine 1 is maximized by undergoing the combustion process.

One such benefit of steam injection is the availability of what one skilled in the art of power plant operation knows as spinning reserve, or excess available generating capacity. Often times, there is a long start-up time (approximately 30 minutes) associated with bringing the steam injection process online to the point that it can be injected into a gas turbine engine. However, this timeframe can be drastically reduced if the steam injection piping is preheated. This allows for additional mass flow to be readily available to the gas turbine engine, providing a spinning reserve through the gas turbine engine 1, should it be necessary in the event of an outage of another plant.

Figure 6:
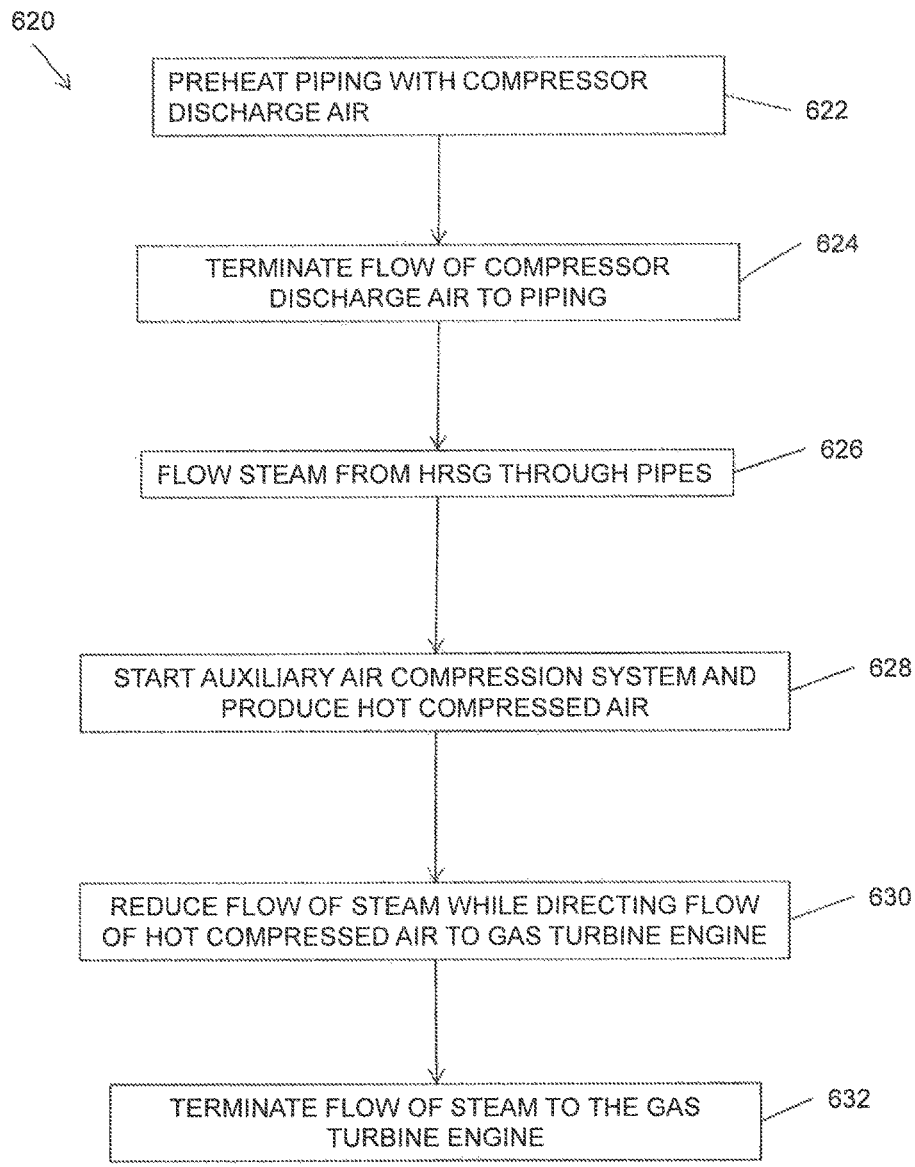
FIG. 6 is a flow diagram depicting a method of providing power augmentation to a gas turbine engine utilizing steam injection and an auxiliary source of compressed air.

Referring now to FIG. 6, a method 620 of providing power augmentation to a gas turbine engine is provided. In a step 622, the piping of a power augmentation system is preheated with compressor discharge air taken from the gas turbine engine. Then, in a step 624, once the piping is at the desired operating temperature, the flow of compressor discharge air is terminated. In a step 626, steam flows from a HRSG, through the piping and to the gas turbine engine. While steam is flowing to the gas turbine engine, an auxiliary air compression system is started in a step 628. Once the auxiliary air compression system is started and produces a flow of hot compressed air, then in a step 630, the flow of steam is reduced while the flow of hot compressed air is directed to the gas turbine engine. Then, in a step 632, the flow of steam to the gas turbine engine is terminated such that only hot compressed air is being added to the gas turbine engine, thereby providing power augmentation to the gas turbine engine.

Figure 7:
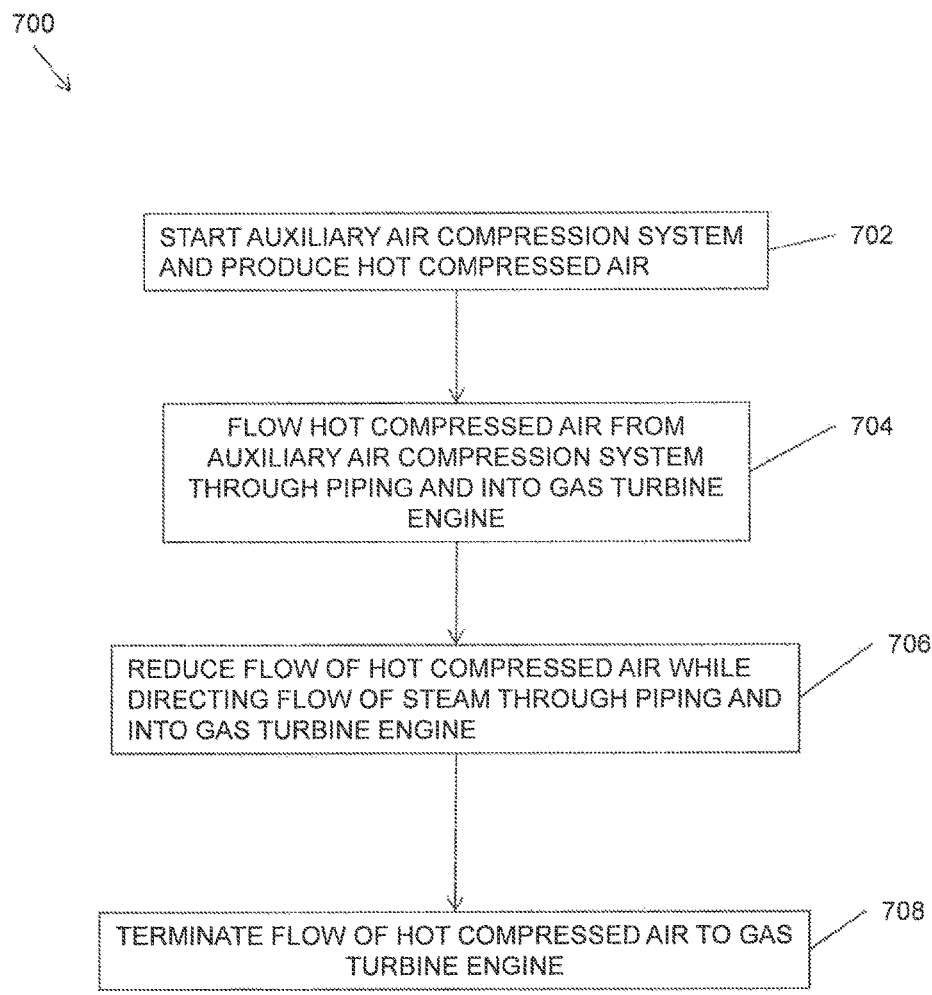
FIG. 7 is a flow diagram depicting a method of improving the efficiency of a gas turbine engine utilizing air injection and steam injection.

Referring to FIG. 7, a method 700 of improving the operating efficiency of a gas turbine engine is disclosed. The method 700 comprises a step 702 of starting an auxiliary air compression system to produce a flow of hot compressed air. Then, in a step 704, the hot compressed air from the auxiliary air compression system flows through the piping and into the gas turbine engine. Then, in a step 706, the flow of hot compressed air is reduced while a flow of steam is directed into the gas turbine engine. The flow of hot compressed air is then terminated in a step 708 such that only steam is injected into the gas turbine engine. Depending on operating conditions, the process outlined above can also include the step of preheating the piping with compressor discharge air prior to hot compressed air from the auxiliary air compression system passing through the piping. In the process outlined above, the auxiliary air compression system provides a source of increased power output via the hot compressed air prior to changing to steam injection, which provides additional mass flow to the gas turbine engine such that fuel consumption by the gas turbine engine is reduced. A reduction in the amount of fuel consumed to produce a specific power output results in cost savings to the engine operator.

Figure 8:
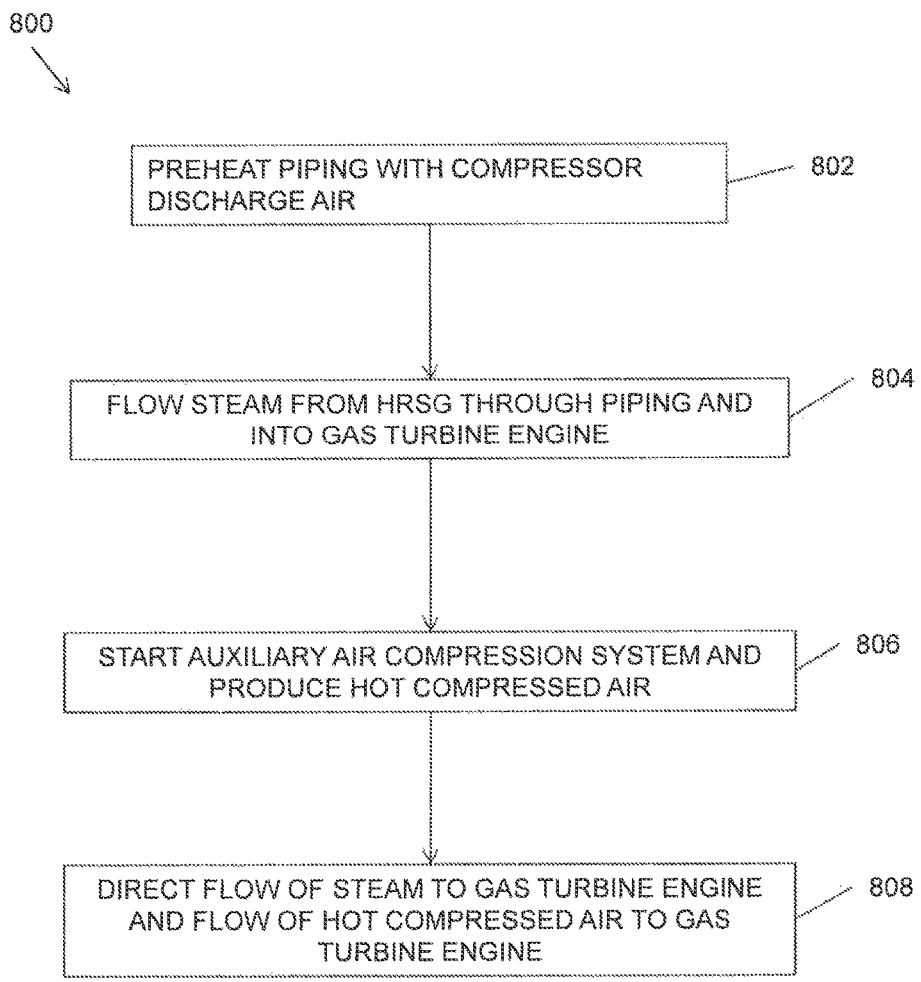
FIG. 8 is a flow diagram depicting a method of providing power augmentation to a gas turbine engine utilizing a combined air injection and steam injection process.

Turning now to FIG. 8, an alternate method of providing power augmentation to a gas turbine engine is disclosed. The method 800 comprises a step 802 of preheating the piping of the power augmentation system with compressor discharge air from the gas turbine engine. Once the piping is at a desired operating temperature the flow in the piping is replaced with steam from the HRSG in a step 804. Then, in a step 806, an auxiliary air compression system is started to produce a flow of hot compressed air. In a step 808, the hot compressed air is directed to the gas turbine engine along with the flow of steam from the HRSG.

Figure 9:
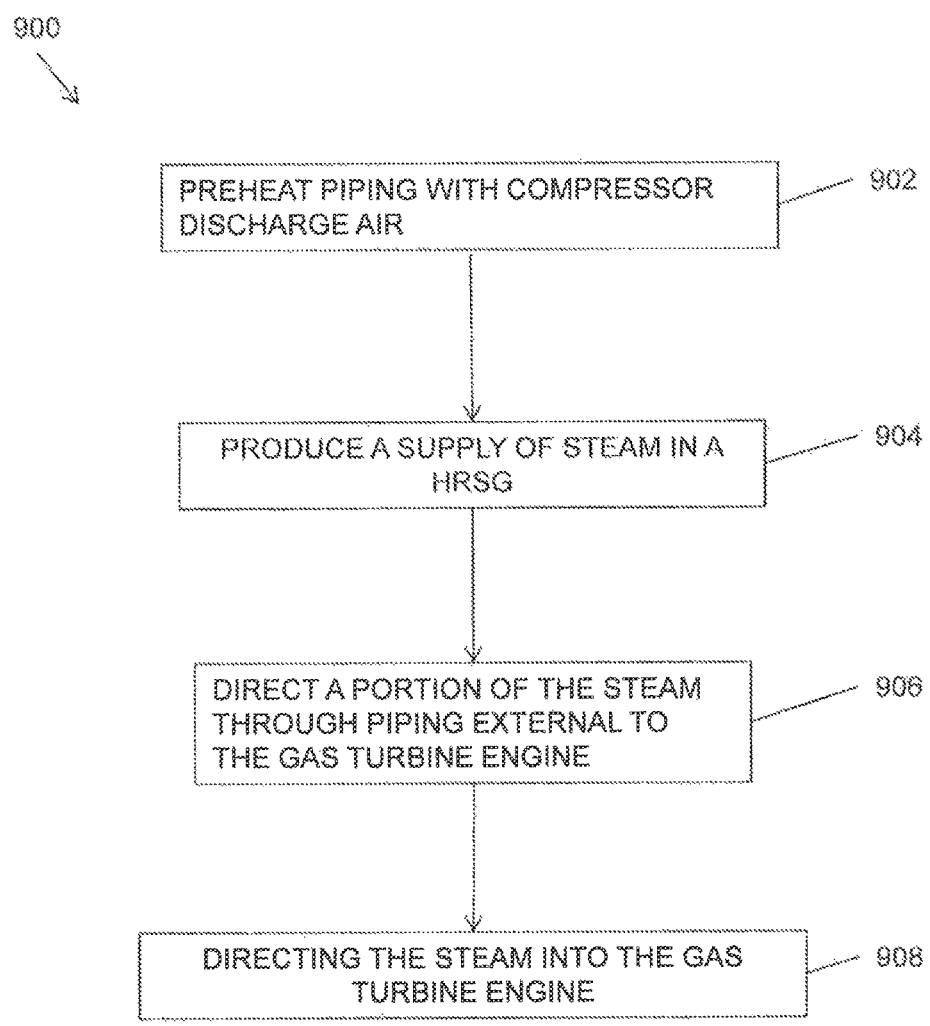
FIG. 9 is a flow diagram depicting a method of improving the efficiency of a gas turbine engine utilizing steam injection.

Referring to FIG. 9, an alternate method of improving the efficiency of a gas turbine engine is provided. In a method 900, the piping of the power augmentation system is preheated with compressor discharge air from the gas turbine engine in a step 902. Then, in a step 904, a supply of steam is produced in a HRSG. In a step 906, a portion of the steam produced in the HRSG is directed through the piping of the power augmentation system, the piping being external to the gas turbine engine. Then, in a step 908, the portion of the steam is directed into the gas turbine engine to provide an additional mass flow to the engine.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A power augmentation system for a gas turbine engine comprising:
    a gas turbine engine comprising a compressor coupled to a turbine by a shaft, the compressor and the turbine in fluid communication with one or more combustors through a compressor discharge case;
    a heat recovery steam generator in fluid communication with the gas turbine engine;
    steam injection piping connecting the gas turbine engine to the heat recovery steam generator;
    an auxiliary air compression system comprising:
        a fueled engine;
        a multi-stage intercooled compressor coupled to the fueled engine;

a recuperator in fluid communication with the multi-stage intercooled compressor and the fueled engine, the recuperator heating air from the multi-stage intercooled compressor with exhaust heat from the fueled engine to produce hot compressed air; and, a valve system comprising a plurality of valves, said plurality of valves including an air injection valve between the recuperator and the steam injection piping, an air vent valve between the air injection valve and a steam injection valve and being configured to vent air compressed by the gas turbine compressor and moving through the steam injection piping towards the heat recovery steam generator, a steam vent valve configured to vent steam from the heat recovery steam generator, the steam injection valve configured for regulating steam injection, and an isolation valve for selectively isolating the steam injection piping from the gas turbine engine;

wherein, the valve system is configured to selectively: (a) collectively direct at least a portion of each of steam from the heat recovery steam generator and hot compressed air from the auxiliary air compression system to the gas turbine engine; and (b) direct, via the steam injection piping, flow of air from the compressor discharge case towards the heat recovery steam generator.

2. The power augmentation system of claim 1, further comprising piping to direct a portion of steam from the heat recovery steam generator to an external process.

3. The power augmentation system of claim 1, wherein the flow of steam provides additional mass flow to the gas turbine engine while the auxiliary air compression system is started.

4. The power augmentation system of claim 3, wherein upon the auxiliary air compression system starting and generating the hot compressed air, injection of the hot compressed air into the gas turbine engine provides power augmentation.

5. A power augmentation system for a gas turbine engine comprising:
a gas turbine engine comprising a compressor coupled to a turbine by a shaft, the compressor and the turbine in fluid communication with one or more combustors through a compressor discharge case;
a heat recovery steam generator in fluid communication with the gas turbine engine;
steam injection piping connecting the gas turbine engine to the heat recovery steam generator;
an auxiliary air compression system comprising:
a fueled engine;
a multi-stage intercooled compressor coupled to the fueled engine;
a recuperator in fluid communication with the multi-stage intercooled compressor and the fueled engine, the recuperator heating air from the multi-stage intercooled compressor with exhaust heat from the fueled engine to produce hot compressed air; and,
a valve system comprising a plurality of valves, said plurality of valves including an air injection valve between the recuperator and the steam injection piping, at least one vent valve between the air injection valve and a steam injection valve and being configured to vent air and steam, the steam injection valve configured for regulating steam injection from the heat recovery steam generator, and an isolation valve for selectively isolating the steam injection piping from the gas turbine engine;

wherein, the valve system is configured to selectively: (a) collectively direct at least a portion of each of steam from the heat recovery steam generator and hot compressed air from the auxiliary air compression system to the gas turbine engine; and (b) direct, via the steam injection piping, flow of air from the compressor discharge case towards the heat recovery steam generator.

6. The power augmentation system of claim 5, wherein the at least one vent valve comprises a steam vent valve and an air vent valve.

7. The power augmentation system of claim 5, further comprising piping to direct a portion of steam from the heat recovery steam generator to an external process.

8. The power augmentation system of claim 7, wherein the external process is a manufacturing plant.

* * * * *